United States Patent [19]

Hansen et al.

[11] Patent Number: 5,569,030
[45] Date of Patent: Oct. 29, 1996

[54] METHOD FOR IMPROVED MANUFACTURE OF CEMENT IN LONG KILNS

[75] Inventors: Eric R. Hansen, Shawnee, Kans.; James R. Tutt, Nash, Tex.

[73] Assignees: Cadence Environmental Energy, Inc., Michigan City, Ind.; Ash Grove Cement Company, Overland Park, Kans.

[21] Appl. No.: 332,459

[22] Filed: Oct. 31, 1994

Related U.S. Application Data

[63] Continuation of Ser. No. 170,496, Dec. 20, 1993, abandoned, which is a continuation of Ser. No. 913,587, Jul. 14, 1992, abandoned.

[51] Int. Cl.⁶ .................................................. F27B 7/00
[52] U.S. Cl. ..................... 432/103; 110/246; 110/346
[58] Field of Search ................................. 110/246, 346; 432/103

[56] References Cited

U.S. PATENT DOCUMENTS

| | | | |
|---|---|---|---|
| Re. 31,046 | 10/1982 | Lambana et al. | 110/187 |
| 2,813,222 | 11/1957 | Collier | 202/6 |
| 3,507,482 | 4/1970 | Kraszewski et al. | 263/32 |
| 3,865,541 | 2/1975 | Wilson et al. | 423/13 |
| 3,888,621 | 6/1975 | Williams | 432/19 |
| 3,916,806 | 11/1975 | Giraud | 110/14 |
| 4,013,023 | 3/1977 | Lambana et al. | |
| 4,022,629 | 5/1977 | Garrett et al. | 106/100 |
| 4,126,471 | 11/1978 | Herchenbach et al. | 106/100 |
| 4,132,332 | 10/1978 | Rotter | 201/15 |
| 4,249,890 | 2/1981 | Graham | 432/13 |
| 4,276,092 | 6/1981 | St. John et al. | 106/100 |
| 4,286,993 | 9/1981 | Lovichi et al. | 106/106 |
| 4,329,180 | 5/1982 | Herchenbach et al. | 106/100 |
| 4,541,346 | 9/1985 | Culliford | 110/246 |
| 4,583,468 | 4/1986 | Reed et al. | 100/246 |
| 4,934,931 | 6/1990 | Angelo, II | 110/246 |
| 4,961,391 | 10/1990 | Mak et al. | 110/346 |
| 5,073,107 | 12/1991 | Lask | 432/103 |
| 5,083,516 | 1/1992 | Benoit et al. | 110/344 |
| 5,100,314 | 3/1992 | Rierson | 432/103 |
| 5,188,041 | 2/1993 | Noland et al. | 110/246 |
| 5,257,586 | 11/1993 | Davenport | 110/246 |
| 5,269,235 | 12/1993 | McGill et al. | 110/246 |

FOREIGN PATENT DOCUMENTS

| | | |
|---|---|---|
| 0455301A2 | 11/1991 | European Pat. Off. |
| WO90/02915 | 3/1990 | WIPO |

OTHER PUBLICATIONS

"Cement–Data–Book", 1976 Bauverlag GmbH; Wiesbaden and Berlin.

*Primary Examiner*—Henry A. Bennett
*Assistant Examiner*—Siddharth Ohri
*Attorney, Agent, or Firm*—Barnes & Thornburg

[57] ABSTRACT

The present invention is directed to a method for controlling the kiln gas stream in a conventional long wet or dry process cement kiln modified for delivery of solid fuel into the calcining zone. Air is injected into the kiln gas stream at a point downstream of the clinkering zone and upstream of the drying zone to promote combustion efficiency downstream of the clinkering zone.

4 Claims, 7 Drawing Sheets

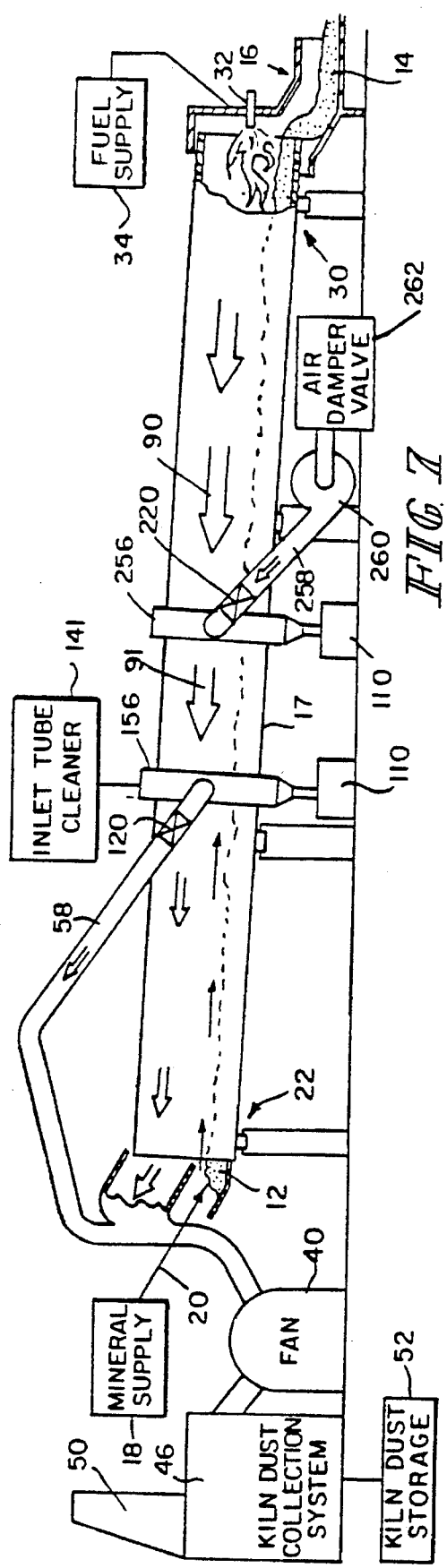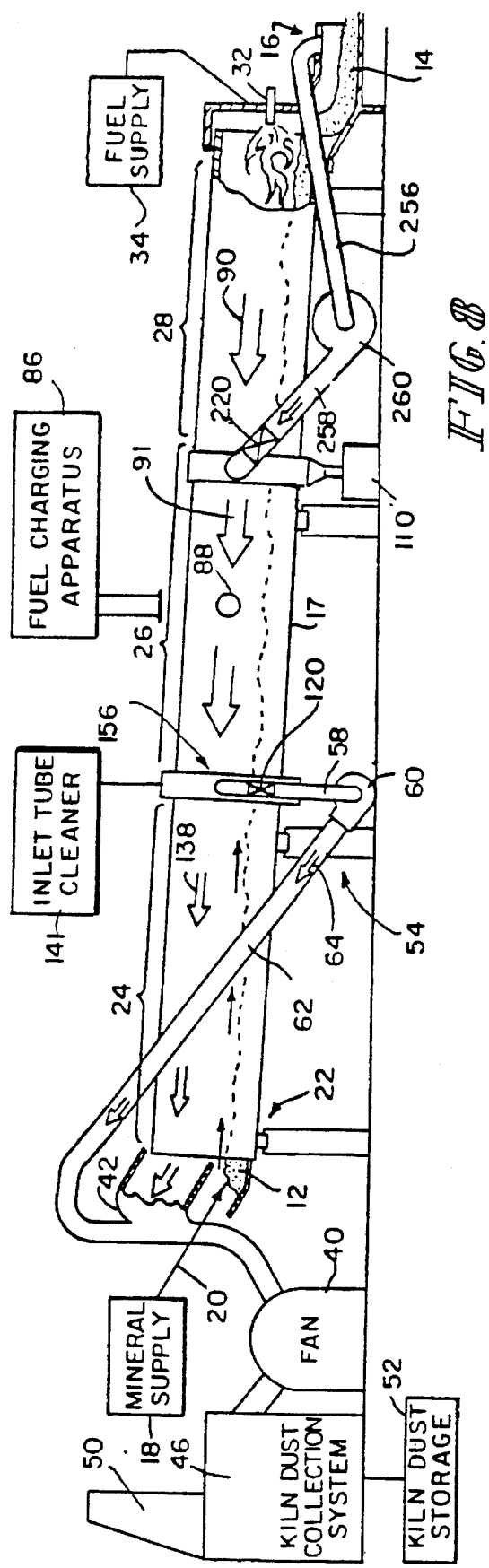

METHOD FOR IMPROVED MANUFACTURE OF CEMENT IN LONG KILNS

This application is a continuation of application Ser. No. 08/170,496, filed Dec. 20, 1993, now abandoned, which is a continuation of application Ser. No. 07/913,587 filed Jul. 14, 1992, now abandoned.

BACKGROUND AND SUMMARY OF THE INVENTION

This invention relates to improvements in the operation and configuration of long rotary cement kilns. More particularly it is directed to a method and apparatus for enhancing the capacity and efficiency of cement clinker production in conventional wet or dry process long rotary kilns. An air injection port is formed in the kiln at a point downstream, relative to kiln and gas flow, of the clinkering zone and upstream of the drying zone, and air is injected in to the kiln gas stream through the port to provide an oxygen-enriched kiln gas stream.

In the widely used commercial process for the manufacture of cement, the steps of drying, calcining, and clinkering cement raw materials are accomplished by passing finely divided raw materials, including calcareous minerals, silica and alumina, through a heated, inclined rotary vessel or kiln. In what is known as conventional long dry or wet process kilns the entire mineral heating process is conducted in a heated rotating kiln cylinder, commonly referred to as a "rotary vessel." The rotary vessel is typically 12 to 15 feet in diameter and 400–700 feet in length and is inclined so that as the vessel is rotated, raw materials fed into the upper end of the kiln cylinder move under the influence of gravity toward the lower "fired" end where the final clinkering process takes place and where the product cement clinker is discharged for cooling and subsequent processing. Gas temperatures in the fired clinkering zone of the kiln range from about 1300° to about 1600° C. Kiln gas temperatures are as low as about 250° to 350° C. at the upper mineral receiving end of so-called wet process kilns. Somewhat higher gas temperatures exist in the upper end of long dry process kilns.

Generally, skilled practitioners consider the cement making process within the rotary kiln to occur in several stages as the raw material flows from the cooler gas exit mineral feed end to the fired/clinker exit lower end of the rotary kiln vessel. As the mineral material moves down the length of the kiln it is subjected to increasing kiln gas temperatures. Thus in the upper portion of the kiln cylinder where the kiln gas temperatures are the lowest, the in-process mineral materials first undergo a drying process and thereafter move into the hotter calcining zone and finally into the portion of the kiln where the kiln gas temperatures are the hottest, the clinkering zone adjacent to the fired lower end of the kiln cylinder. The kiln gas stream flows counter to the flow of in-process mineral materials from the clinkering zone, through the intermediate calcining zone and the mineral drying zone and out the upper gas exit end of the kiln into the kiln dust collection system. The flow of kiln gases through the kiln can be controlled to some extent by a draft induction fan positioned in the kiln gas exhaust stream.

The drying/pre-heat zone of a long process kiln is defined as that part of the kiln in which sufficient heat transfer takes place from the kiln gas stream to the mineral bed to eliminate moisture from the mineral raw material feed. In the drying zone, the mineral material is heated to a temperature of up to approximately 1500° F., the temperature at which mineral carbonates begin to calcine (release carbon dioxide). To facilitate the transfer of heat in the drying/pre-heat zone, chain curtains are provided. As mineral material is introduced and travels down the length of the drying zone, the chains continually rotate between the hot kiln gas phase and the mineral material phase transferring heat from the gases to the raw materials.

One of the shortcomings of the use of conventional long kilns for cement manufacture derives from the significant quantities of dust generated in the drying zone of the kiln and carried out of the kiln in the kiln gas stream. On the average about 7–10% (but as high as about 17%) of the raw material feed on a dry basis is blown back from the drying zone as dust. The high dust loss associated with the manufacture of cement clinker in long wet or dry process kilns places long kiln operators at a significant economic disadvantage relative to cement manufacturers using the newer pre-heater/pre-calciner kilns. High dust loss not only means loss of efficiency of use of raw materials—dust recovery is limited because of contamination by volatile alkali salts—but it also requires greater capital investment in dust collection equipment and loss of energy efficiency. Every ton of raw material lost as dust consumes significant amounts of heat energy during drying. Further the long kiln operator is burden by the cost of handling/disposal of waste dust.

Another disadvantage suffered by cement manufacture in conventional long kilns relative to that in pre-heater/pre-calciner kilns derives from the internal cycling of volatile alkali salts. As the in-process mineral travels down the kiln to the hotter zones, alkali salts such as potassium and sodium sulfates in the mineral are volatilized into the kiln gas stream and carried as an alkali fume into the coolest zones of the kiln, including particularly the dust generating drying zone where the alkali fume condenses on the dust and either falls back into the in-process mineral bed or is carried out of the kiln in the kiln gas stream and collected with the kiln dust in the dust collection system. It is the presence of the significant quantities of condensed alkali salts in the kiln dust that prohibits the return of the dust to the process—adding the alkaline dust to the mineral raw material can disrupt the alkali salt recirculation equilibrium and cause unacceptably high alkalinity in the cement product.

During cement kiln operation there is significant recirculation of alkali salts from the mineral bed to the kiln gas stream and back to the mineral bed. At equilibrium conditions where the alkali salts are carried out of the kiln at the same rate at which they are introduced in fuels and raw materials, it is estimated that there is 90% trapping of the volatilized alkali. The internal cycling of high quantities of alkali salts during kiln operation constitutes a significant energy burden on the process. Large quantities of high grade heat in the hotter zones of the kiln (where the heat is needed most) are lost to alkali volatilization only to be returned to the process as low grade heat during condensation in the lower temperature zones where excess heat is not needed. The configuration of pre-heater/pre-calciner kilns allows facile installation of alkali bypass conduits through which a portion of the alkali fume-laden kiln gas stream can be withdrawn before it becomes contaminated with entrained kiln dust, thereby not only reducing the alkali load in the internal cycle, but also providing means for recovery of a product highly enriched in the volatile alkaline salts. Until now, there has been no means for establishing an alkali bypass for conventional long wet or dry process kilns.

There are many existing long kiln cement manufacturing operations, not only in the United States but in many other countries as well around the world. The development of a method/apparatus for reducing dust loss and for enhancing control of the internal alkali cycling in long kiln cement manufacturing operations will enable long kiln operators to be more economically competitive with pre-heater/pre-calciner kiln operators.

Thus it is one object of this invention to provide an apparatus and method to reduce the dust loss in the manufacture of cement in long wet or dry process kilns.

It is another object of this invention to reduce the alkali content of kiln dust produced during the manufacture of cement in long kilns.

Another object of this invention is to provide a method and apparatus for enhancing the capacity and economic efficiency of clinker production in conventional long wet or dry process kilns.

Another more general object of this invention is to provide an apparatus for controlling the kiln gas stream in a rotary cement kiln by allowing withdrawal of kiln gas and/or injection of air through ports in the wall of the rotary kiln vessel into the kiln gas stream at pre-determined points along the length of the rotary kiln vessel.

It is still another object of this invention to modify a conventional long wet or dry process kiln to enhance efficiency of raw material usage in cement clinker manufacture.

It is another more particular object of this invention to provide a more energy efficient method of cement manufacture in long kilns by providing a kiln gas stream bypass for long kilns.

Still another important object of this invention is to provide a method for monitoring combustion efficiency in long kilns without interference from volatilized organics from the cement raw materials.

Those and other objects of this invention are accomplished by modifying the kiln to allow withdrawal of a portion of the kiln gases from the rotary vessel at a point upstream, relative to kiln gas flow, of the mineral drying zone. By removing a portion of the kiln gas from the calcining zone, or more particularly from a point upstream, relative to kiln gas flow, of the mineral drying zone (most particularly the chain curtain section) and downstream of the hottest portions of the calcining zone, there is achieved a substantial reduction in dust generated and lost from the drying zone. Reduced dust loss derives not only from reduced kiln gas velocities in the drying zone, but also from the resultant extension of the drying zone itself. Removing a portion of the hot kiln gas stream results in an extended drying zone—the raw feed will have a greater moisture content through the chain curtain section of the kiln, effectively reducing the generation of dust in the drying zone.

Preferably the bypass is designed to withdraw at least about 10% of the hot kiln gases at a point upstream of the mineral drying/pre-heat zone. The bypass gases are cooled, for example, by mixing with ambient air and either returned to the kiln gas stream upstream of the kiln dust collection system, including for example, an electrostatic precipitator, or directed to an independent dust collection system.

A 10% reduction of kiln gas flowing through the drying zone is expected to result in an average velocity reduction in the drying zone of about 20% by the combined action of reduced mass and temperature. With that velocity reduction, the amount of dust blown by the gas stream out the upper gas exit end of the kiln will decrease significantly. The reduced dust loss allows an associated reduction in the amount of raw material for the same amount of clinker production. Of course, reduced dust loss also means less dust requiring disposal by the kiln operator and less of a dust load on the dust collection system.

It has recently been reported in the art that conventional long kilns can be modified to provide an environmentally safe and economically advantageous use of solid waste fuels. Apparatus and methods for delivering solid fuels, especially solid waste fuels, are known in the art. See, for example, U.S. Pat. Nos. 4,930,965, 4,969,407, 4,850,290, 5,078,594 and 5,083,516. The delivery of solid fuel into the calcining zone in accordance with the teachings of those patents tends to increase the temperature of the kiln gas stream, and concomitantly kiln gas stream velocity, through the drying zone with potential enhanced dust loss. The present long kiln bypass method and apparatus can be utilized in conjunction with use of the art-recognized methods and apparatus for burning combustible solids, particularly combustible waste solids, as supplemental fuel in long kilns.

According to this invention, a method is provided for enhancing the capacity and efficiency of clinker production in an operating conventional long wet or dry process kiln. The method comprises the step of withdrawing a portion of the kiln gases from the rotary vessel at a point upstream, relative to kiln gas flow, of the mineral drying/pre-heat zone and preferably downstream (relative to kiln gas flow) of the downstream end of the calcining zone or at least downstream of the hottest portion of the calcining zone. The kiln gas bypass stream is preferably recombined with the gases discharged from the exit end of the kiln at a point upstream, relative to kiln gas flow, of the kiln dust collection system. Preferably, at least 10% of the kiln gas stream is withdrawn to form the bypass stream.

The bypass stream is preferably cooled (quenched) by its mixture with ambient air optionally in combination with a water spray to precipitate alkali fume. In one preferred embodiment at least a portion of the precipitated alkali fume itself is separated from the bypass stream before the quenched bypass stream is recombined with the kiln gas stream upstream of the kiln dust collection system. Removal of at least a portion of the precipitated alkali fume from the bypass stream reduces alkali content of the dust collected in the dust collection system, even to the extent that the collected dust can be combined with mineral raw materials and returned to the cement manufacturing process without compromising clinker quality.

In a preferred embodiment the kiln bypass stream is withdrawn through a port in the rotary vessel having means for preventing in-process mineral material from flowing through said port. The port is in alignment with an annular plenum around the rotary vessel and in gas flow communication with the port. Means are provided for creating reduced pressure in the annular plenum to withdraw at least a portion of the kiln gas stream out of said port and into the annular plenum. The bypass stream can be processed to collect at least a portion of the precipitated alkali before it is recombined with the kiln gas stream.

In a preferred embodiment, the present invention provides an improvement for conventional wet or dry long rotary kilns, the improvement comprising a bypass port in the rotary vessel at a point upstream, relative to kiln gas flow, of the mineral drying zone and means for preventing in-process mineral material from flowing through said port during kiln operation. An annular plenum is provided in axial alignment with the port on the rotary vessel and in gas flow communication with the port. The plenum is coupled with a means for creating reduced pressure in the plenum to withdraw at least a portion of the kiln gas stream out the port and into the annular plenum.

Use of the present bypass apparatus of the present invention in long kilns provides multiple advantages to the cement manufacturing process. The operation of the present bypass system will allow the drying zone of the kiln to operate somewhat independently of the rest of the process. The energy demands of the calcining process are such that more than sufficient energy remains at the process boundary between the calcining and drying/pre-heating zones to accomplish the drying/pre-heating step. By rerouting a portion of the kiln gas around the drying/pre-heating zone through the bypass duct, the amount of energy supplied to the drying/pre-heating zone will more closely match the process requirements of this zone. Consequently, the volume of gases passing through this zone will be reduced, thereby resulting in lower gas velocity. The lower velocity will in turn reduce the amount of in-process material that will be entrained in the kiln gas stream and exit the kiln as cement kiln dust. The reduced velocity of the gas stream in the drying zone during operation of the bypass system results in a 40–75% reduction of kiln dust lost from the kiln, thereby resulting in increased process economy.

Pieces of chain are suspended in the drying/pre-heating zone as an internal heat exchange device. The suspended chains also trap some of the volatile salts (e.g., $K_2SO_4$) in the process until equilibrium is reached and an internal cycle of volatile constituents is established in which these constituents leave the process at the same rate at which they are introduced in fuels and raw materials. An internal cycle of alkali salts can cause operating problems such as the buildup of material rings in the kiln. By rerouting a portion of the hot kiln gas containing the gaseous volatile constituents around the chain system, the magnitude of the internal cycle will be reduced, thus improving kiln operation. During operation of the bypass, "bypass gas" will be extracted prior to the gas entering the turbulence of the chain system. As a result, it is expected that there will be little suspended particulate matter in this bypass gas; however, the hot bypass gas will contain the alkali fume and other volatilized components—one target of the bypass arrangement.

When the bypass gas stream is recombined with the exit gas from the drying/pre-heating zone of the kiln prior to its entry into the air pollution control (dust collection) system, the thermal energy in the bypass gas ensures that the temperature of the gas is above the dew point even if the kiln exit gas itself is at or below the dew point.

Under 40 C.F.R. 266.104(g), monitoring of CO and THC in a bypass duct is allowed as a means of complying with CO and THC limits, provided that: (1) hazardous waste is fired only into the kiln and not at any location downstream from the kiln exit relative to the direction of gas flow (i.e., downstream from the bypass); and (2) the bypass diverts a minimum of 10% of the kiln off-gas into the duct. The preamble to the BIF regulation (56 F.R. 7159, Feb. 21, 1991) acknowledges that a rationale for allowing monitoring in a bypass duct is that a bypass would preclude the interference of non-fuel THC emissions from raw materials. In long kilns, the raw material is heated in the drying/pre-heating zone to a temperature sufficient to evaporate the hydrocarbons contained therein. The hydrocarbons from that heating process are contained in the kiln exit gases. The bypass duct will draw gas from the kiln prior to its entry into the drying/pre-heating zone; therefore, gases will not have been affected by the raw material heating process. Thus, the monitoring of the bypass gases is a true representation of the gases from the combustion process without interference from hydrocarbons in the raw material.

The present invention also enables enhanced clinker production capacity in long kilns. There are two limiting factors in the production of cement in long wet process kilns: (1) the kiln gas velocity in the drying zone causing dust loss; and (2) thermal loading in the sintering zone. Inherently these factors work to limit the amount of heat energy that can be delivered into the kiln for transfer for the in-process mineral. The impact of the first of those limiting factors can be minimized by use of the present bypass apparatus. Subject to the limitations imposed by factor (2) above, the bypass apparatus can be used to reduce kiln gas stream velocities in the drying zone even with significantly higher energy input into the process.

The impact of limiting factor (2) has been resolved by the recently developed technology for mid-kiln firing of solid fuels, including particularly solid waste derived fuels. The apparatus of the present invention can be used advantageously in combination with kiln modifications described in the art for allowing delivery of solid combustible materials to the calcining zone of an operating kiln as supplemental fuel for the cement manufacturing process. It is anticipated that use of the present bypass method in conventional long kilns in combination with the recently developed mid-kiln firing technology will enable up to a 40% increase in clinker production capacity, with enhanced energy efficiency and enhanced raw material conversion efficiency and without compromise of clinker quality. Indeed, the estimated 40% increase in long kiln capacity enabled by use of the present bypass with mid-kiln firing of solid fuels is limited itself only by the cooling of the main flame of the kiln by flow of the high volume of tertiary air necessary to support combustion in the mid-kiln region (in the calcining zone or at least at some point downstream of the clinkering zone). That limitation can be obviated by use of the present apparatus located at a point along the rotary vessel to add tertiary air into the kiln gas stream at a point downstream of the clinkering zone and upstream (relative to kiln gas flow) of the secondary burning zone. The use of the present apparatus for injection of air into the kiln requires, of course, that the plenum be coupled with means for creating increased pressure in the plenum relative to the recipient portion of the kiln gas stream.

It is also contemplated in accordance with this invention that the present apparatus (as a tertiary air injection device) can be located along the length of a rotary kiln at a point above the beginning of the calcining zone (where kiln gas temperature are generally 1800° F. or lower) to facilitate oxidation of hydrocarbons volatilized from the mineral raw materials without detracting from process thermal efficiency.

Thus, the pressure in the annular plenum of the present apparatus can be controlled either to regulate air delivery into the kiln gas stream or to induce bypass flow depending on the function required at that point in the process to enhance kiln combustion/operation efficiency.

Additional features and advantages of the invention will become apparent to those skilled in the art upon consideration of the following detailed description of the preferred embodiments exemplifying the best mode of carrying out the invention.

BRIEF DESCRIPTION OF THE DRAWINGS

FIGS. 7 and 8 are similar to FIGS. 1 and 4 presenting diagrammatic views of long kilns modified with the apparatus in accordance with this invention.

DETAILED DESCRIPTION OF THE INVENTION

Figure 1:
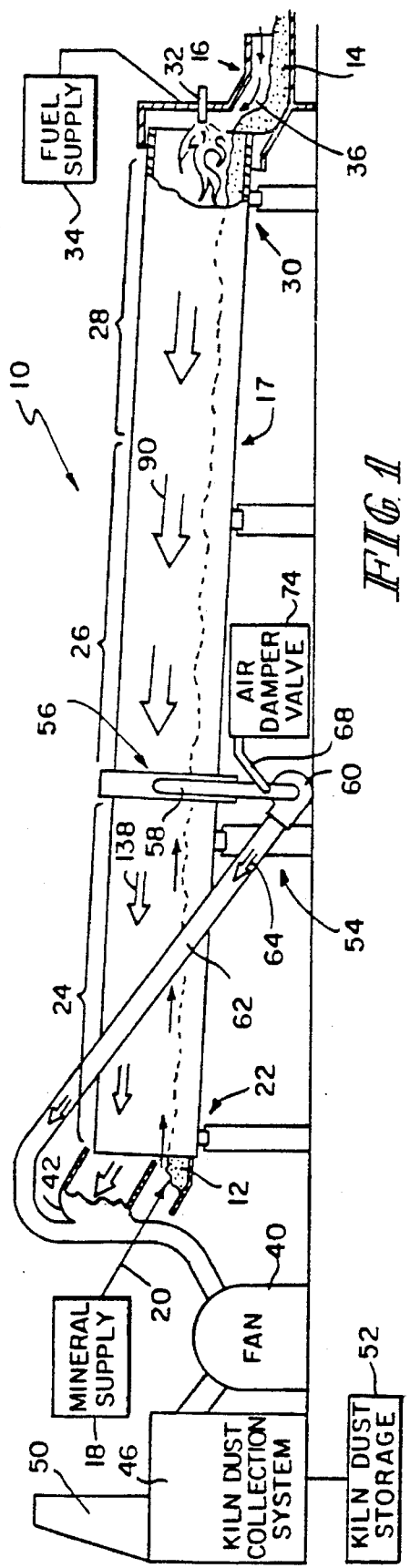
FIG. 1 is a diagrammatic view of an improved long rotary kiln in accordance with the present invention showing mineral flow in a downhill direction through the drying, calcining and clinkering zones in a rotary vessel, hot kiln gas flow in an uphill direction in the rotary vessel, and a kiln gas bypass for withdrawing a portion of the hot kiln gases to produce a kiln gas bypass stream.

An improved long rotary kiln 10 for converting mineral materials 12 into cement clinker 14 is illustrated in FIG. 1. The kiln 10 includes an inclined rotary vessel 17 and means (not shown) for rotating the rotary vessel 17 about its longitudinal axis. Mineral materials 12 from mineral supply 18 are charged into mineral inlet 20 at upper end 22 of the rotary vessel 17. As rotary vessel 17 is rotated, mineral materials 12 move under the influence of gravity through a mineral drying/pre-heat zone 24, a calcining zone 26 and a clinkering zone 28 before being discharged as cement clinker 14 from lower end 30 of rotary vessel 17 into cooling chamber 16.

Fuel from fuel supply 34 is combined with combustion air 36 pre-heated as it is drawn through cooling chamber 16 and burned using burner 32 in the clinkering zone 28 of rotary vessel 17. A chain system or the like (not shown) is used to improve the efficiency of heat transfer from the hot kiln gases flowing through the mineral drying/pre-heat zone 24 to the mineral materials 12. The chains are exposed to the hot kiln gases and deliver heat to the mineral bed 12 during rotation of rotary vessel 17. The hot kiln gas stream 90/138 generated by fuel combustion at burner 32 in clinkering zone 28 flows toward upper end 22 of rotary vessel 17 under influence of negative pressure created by fan 40. The kiln gas stream 138, after exiting upper end 22 of rotary vessel 17 is directed to kiln dust collection system 46 including an electrostatic precipitator or other suitable gas cleaning system to separate kiln dust into dust storage 52 and an environmentally acceptable air stream delivered into the atmosphere through stack 50.

Figure 4:
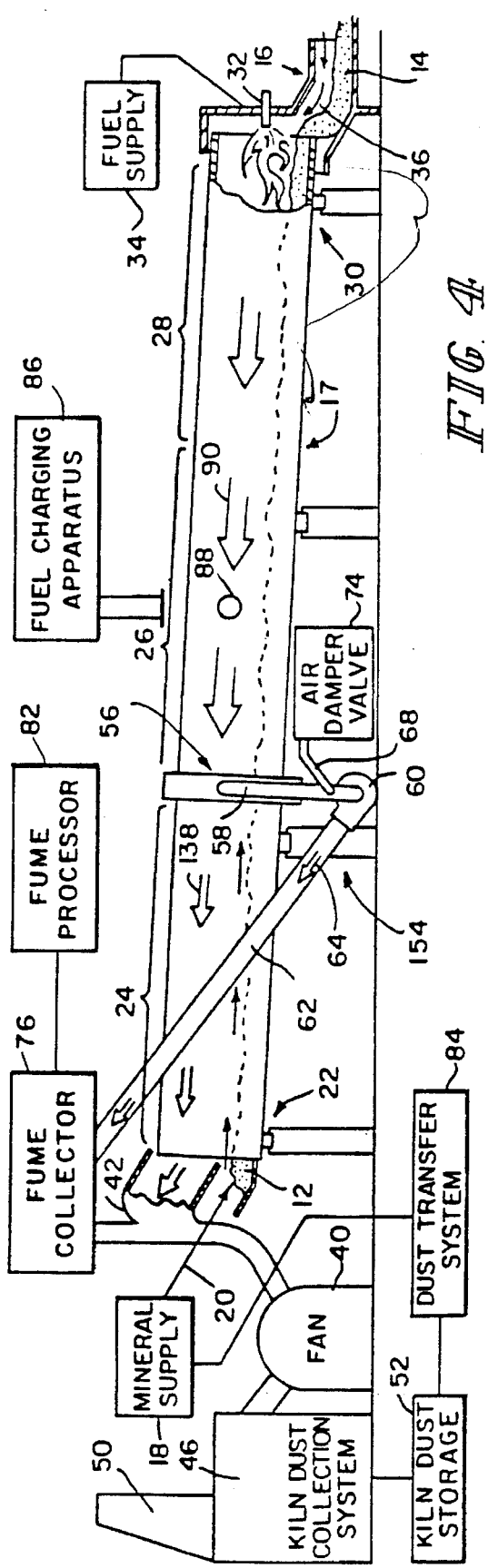
FIG. 4 is a diagrammatic view of a long rotary kiln equipped with a bypass of this invention and a system for charging solid fuel into the calcining zone.

The configuration of the elements of the mineral feed components and the kiln gas processing components at the upper end 22 of rotary vessel 17 are well known those skilled in the art and it should be appreciated that such elements are shown diagrammatically in FIGS. 1 and 4 to illustrate their relationship and cooperation in operation of rotary kiln 10. It will be understood that any of a wide variety of mineral loading and kiln gas handling systems may be incorporated into the kilns modified in accordance with the present invention.

Further with reference to FIG. 1 a kiln gas bypass system 54 is provided for withdrawing a portion of the kiln gas stream from rotary vessel 17 during kiln operation to produce a kiln gas bypass stream 64 which is delivered through bypass conduit 62 to the kiln gas stream in kiln gas exhaust conduit 42 after the gas stream exits the upper end 22 of rotary vessel 17. Bypass system 54 includes a venting apparatus 56 in gas flow communication with the kiln gas stream 90 in rotary vessel 17 and with bypass conduits 58, 62 through bypass fan 60. Venting apparatus 56 is located at a point along the axial length of rotary vessel 17 upstream, relative to kiln gas flow, of the mineral drying/pre-heat zone 24. It can be located a point in alignment with the calcining zone 26 or more preferably at a point corresponding to the downstream (relative to kiln gas flow) end portion of the calcining zone 26. The venting apparatus 56 can be located on the rotary vessel 17 at a point intermediate between the chain system (not shown) in mineral drying zone 24 and a downstream portion of the calcining zone 26. The preferred location of the venting apparatus can be stated alternatively as between the chain system (not shown) in the mineral drying zone 24 and the middle of rotary vessel 17—functionally between the chain system of the mineral drying zone 24 and the hottest portions of the calcining zone 26. Most preferably, the venting apparatus 56 is located at a point on the rotary vessel that is about one kiln diameter upstream relative to kiln gas flow, of the chain system in the mineral drying zone 24.

In operation kiln bypass system 54 is utilized to withdraw a portion of the kiln gas stream from rotary vessel 17 to reduce the velocity (and mass) of kiln gases flowing through the mineral drying zone 24 thereby reducing the amount of dust that is discharged from upper end 22 of rotary vessel 17 during kiln operation. The bypass gas stream 64 is returned to the kiln gas stream at a point downstream of the mineral drying zone 24 and upstream of the kiln dust collection system 46. The resultant reduced kiln gas velocities in mineral drying zone 24 effects a significant reduction in dust lost during cement manufacture. The reduced dust loss enhances the efficiency of cement clinker production not only by decreasing the raw material/clinker production ratio but concomitantly allows for enhanced energy/fuel efficiency.

Figure 2:
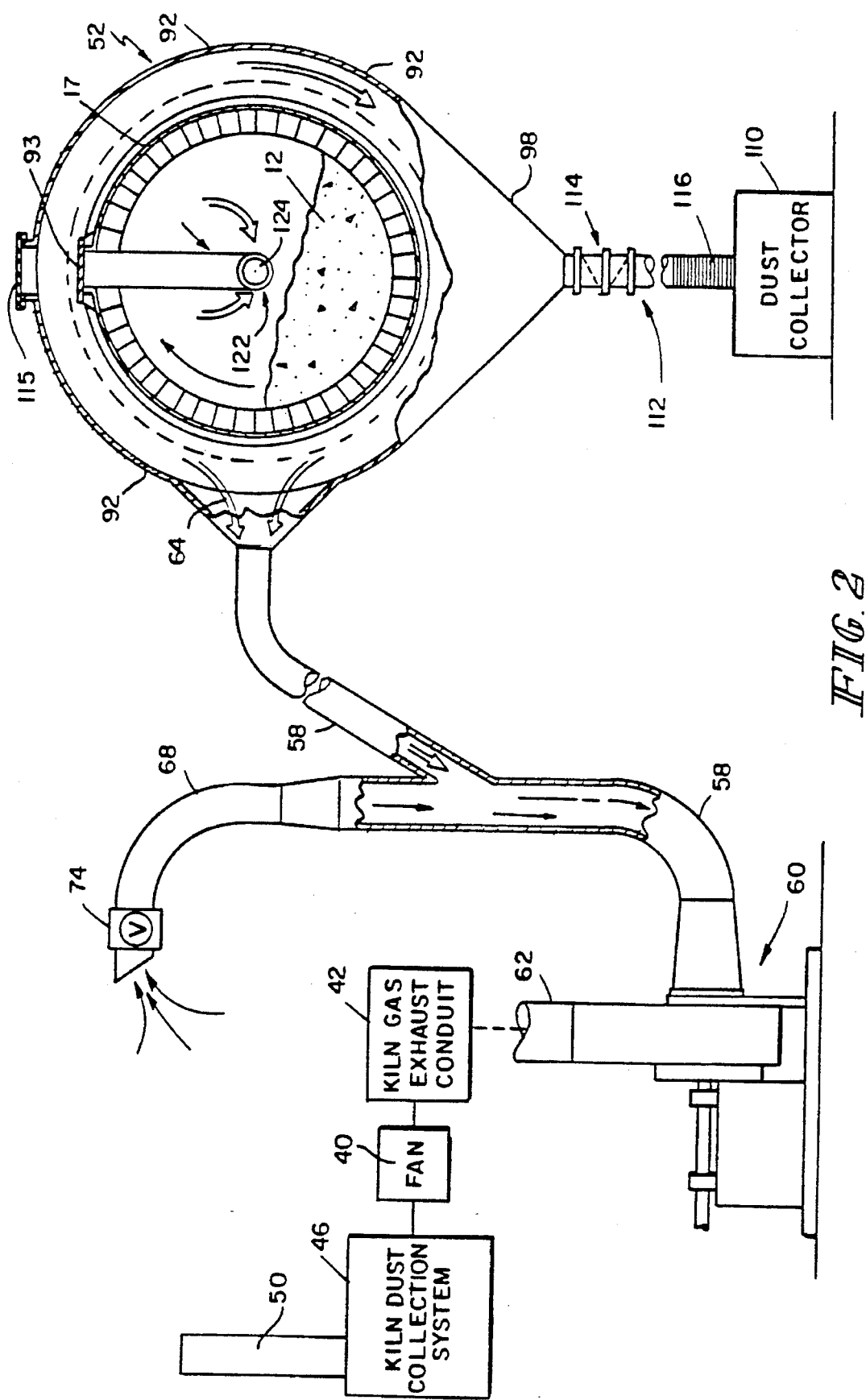
FIG. 2 is an enlarged cross sectional view of the bypass device shown on the rotary kiln of FIG. 1.
Figure 3:
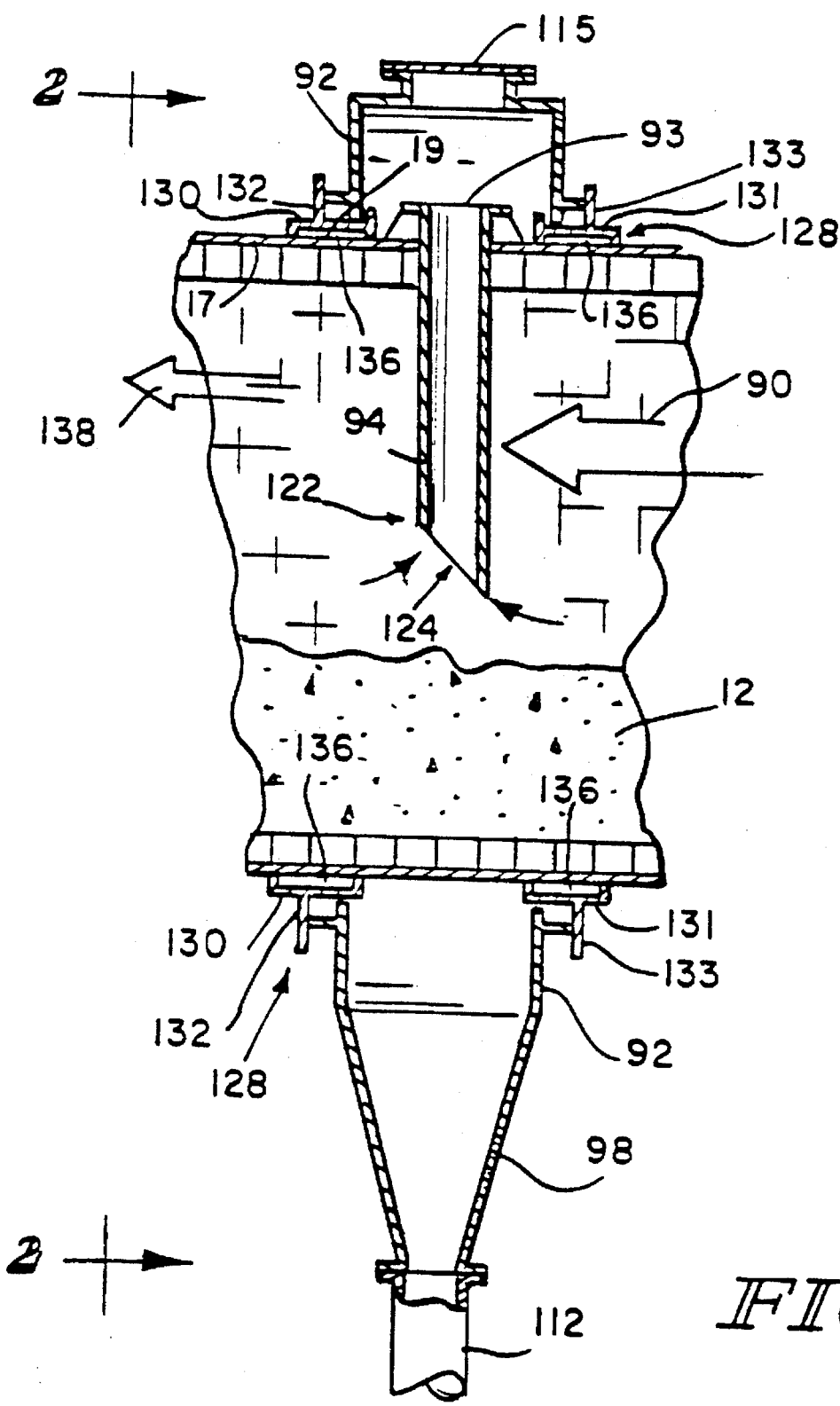
FIG. 3 is another view of the bypass device of FIG. 2 showing a portion of the rotary vessel.

Bypass system 54 is illustrated in more detail in FIGS. 2 and 3. Venting apparatus 56 is located axially on rotary vessel 17 to enable withdrawal of about 10 to about 35% of the kiln gas stream at a point upstream of the mineral drying zone during kiln operation. With reference specifically to FIG. 2, venting apparatus 56 includes a refractory-lined annular plenum 92 in gas flow communication with the inside of rotary vessel 17 through bypass inlet tube 94 and bypass port 93 in rotary vessel 17. Annular plenum 92 is extended in its lower portion to form a dust collection funnel 98 for directing kiln dust into conduit 112 through double tipping valve 114 and flexible boot 116 into dust collector 110. Annular plenum 92 is also provided with a sealable service hatch 115 to permit access to bypass port 93 and bypass inlet tube 94 for cleaning or repair. Bypass inlet tube 94 extends into rotary cylinder 17 from port 93 to prevent loss of mineral material 12 through port 93. The length of the bypass inlet tube 94 is preferably selected to be the minimum length necessary to assure that the tube penetrates the load to prevent escape of in-process mineral through the port 93 during kiln rotation. The inlet tube can be optionally perforate to optimize representative sampling of the kiln gas stream during kiln operation. That is particularly important where the kiln bypass stream is monitored/analyzed to assess kiln combustion efficiency, thus avoiding the interference from raw material-entrained organics present in the kiln gas stream as it exits the rotary vessel during kiln operation. As shown best in FIG. 3 the inner terminus 122 of bypass inlet tube 94 is angularly cut so that the cross sectional area of the orifice 124 of the inlet tube 94 is greater than the cross sectional area of the tube itself. The bypass inlet tube 94 is positioned so that the orifice 124 is directed toward the mineral drying zone 24, again, as shown best in FIG. 3. However, the orientation of the orifice 124 of inlet tube 94 is not critical.

A bypass stream is formed by withdrawing at least a portion of the kiln gas stream in rotary vessel 17 through bypass inlet 94 and port 93 and into the annular plenum 92 under the influence of a negative pressure (relative to that in rotary vessel 17) induced by bypass fan 60 and/or fan 40. Hot bypass stream 64 flows from annular plenum 92, again under the influence of negative pressure from bypass fan 60 and/or fan 40 though bypass conduit 58 where it is mixed with ambient air drawn through air damper valve 74 operated manually or automatically to control ambient air flowing into air conduit 68. Conduits 58 and 68 and damper valve 74 are preferably sized so that the ratio of the volume of ambient air flowing through conduit 68 to the volume of gas bypass stream 64 is about 1:1 to about 5:1, the lower ratios (and thus higher bypass gas temperatures) being preferred to keep the volume of the bypass stream to a minimum. Air damper valve 74 and bypass fan 60 can be controlled to adjust the ratio of ambient air to the bypass gas stream thereby allowing control of the temperature of the resultant ambient air/gas bypass mixture entering bypass fan 60 as it is returned to the kiln gas exhaust conduit 42 at a point downstream from the kiln drying zone. Optionally the ambient air-quenched gas bypass stream can be processed to remove at least a portion of the alkali fume precipitated from the bypass stream before the bypass stream is returned to the kiln gas stream. The extent of quenching is dictated principally by the operating temperature limits of the materials used for construction of the bypass system and the need to control the condensation of the volatile alkali components of the bypass stream. If a bypass fan is required (it is optional where fan 40 is capable of inducing sufficient bypass flow through the venting apparatus and bypass conduits), the bypass temperature is usually limited by the operating temperature limits for the fan. Typically, industrial fans specified for this type of operation have a maximum operating temperature of about 800° F., but fans having a higher maximum operating temperature are available at much greater capital cost. Preferably the bypass gas should be quenched in the annular plenum to a temperature of less than about 1400° F. to minimize build up of condensed alkali salts. Typically there will be a certain amount of air in leakage (and quenching) in the annular plenum due to the inherent air leakage characteristic of the seal between the plenum and the rotary vessel.

Air infiltration at the interface of the stationary annular plenum 92 and the outer surface of rotary vessel 17 is minimized by use of a sealing system 128. Sealing system 128 includes annular sealing rings 130, 131 mounted on rotary vessel 17 proximal to the upstream and downstream sides respectively of bypass port 93 for wiping (and sealing) engagement with complementary sealing surfaces 132, 133 on stationary annular plenum 92. Each of the annular sealing rings 130, 131 and the sealing surfaces 132, 133 are mounted on the kiln surface and the plenum, respectively, to maximize air cooling of the outer surface 19 of the rotary vessel 17. Preferably the annular sealing ring 130, 131 is mounted to define an insulating air gap 136 between the sealing ring and the outer surface 19 of rotary vessel 17. Similarly, the sealing surfaces 132, 133 on the stationary plenum are mounted on plenum 92 to utilize air to insulate the surfaces from direct exposure to the hot bypass gas stream.

Construction of the bypass and its associated components, including particularly the bypass inlet tube 94, the annular plenum 92 and conduit 58 should be of materials which will withstand the thermally harsh conditions inherent in operation of the bypass. The temperature of the bypassed kiln gas as it enters the stationary plenum 92 can be as high 1800° F. Thus, the bypass inlet tube 94 and stationary plenum 92 is typically constructed using hot rolled steel (A36-Plate). The plenum 92 and bypass conduit 58 are refractory-lined. The sealing surfaces 132, 133 on the annular plenum 92 should be capable of maintaining sealing engagement with the annular sealing ring 130, 131 mounted on rotary vessel 17 during kiln operation. The sealing surface 132, 133 can be constructed, for example, of graphite, capable of maintaining sealing engagement with the annular sealing rings 130, 131 during rotation of rotary vessel 17.

The formation of a bypass stream from an operating long wet or dry process rotary kiln in accordance with the present invention offers multiple advantages to the cement making process. Firstly as mentioned above formation of the bypass stream reduces the mass/velocity of kiln gases traversing the mineral drying zone 24. That works in at least two ways to reduce dust lost. It reduces the amount of energy delivered to the drying zone thereby extending the drying zone in the chain system—the more moisture retained by the mineral in the chain system, the less the tendency of the drying mineral to produce dust. Further, and perhaps more directly, the formation of a bypass stream upstream of the drying zone 24 reduces the velocity of the kiln gas stream flowing through the drying zone and concomitantly reduces its ability to carry dust out the upper gas exit end of the operating kiln.

Further, the formation of a bypass stream can be used to regulate the temperature of kiln gas stream exiting the upper end 22 of the rotary vessel. The bypass system of the present invention can also be used to remove alkali from the cement making process. Alkali components are volatilized in the calcining and clinkering zones of the kiln. Without use of the bypass system alkali components volatilized into the kiln gas stream condense on the dust particles in the kiln drying zone and either fall back into the mineral bed or contaminate the kiln dust blown out of the kiln by the kiln gas stream to the extent that it cannot be added back to supplement the mineral material for the cement making process. The bypass system allows the kiln operator not only to reduce dust lost, but as well, to reduce the alkali content of the dust that exits the back of the kiln that is produced during use of the bypass system. Further, the bypass stream can be processed to remove at least a portion of the alkali fume before it is returned to the kiln gas stream upstream of the kiln dust collection system. The high alkali dust isolated from the quenched bypass stream can be collected and used as a source of alkali (potassium, sodium and other volatile metal salts).

With reference to FIG. 4 bypass system 154 includes a fume collector 76 (for example, a cyclonic precipitator). The high alkali fume precipitant can be utilized beneficially as a source of alkali; for example, it can be treated in fume processor 82 to concentrate the respective alkali components. The precipitation of alkali fumes in the bypass system reduces the alkali values in the kiln dust removed from the kiln gas stream by dust collection system 46. The alkali-lean dust can be used advantageously by mixing it with mineral materials 12 for delivery into rotary vessel 17. Accordingly, a dust transfer system 84 is provided to deliver recyclable dust from dust storage 52 to, for example, mineral supply 18.

Also, shown diagrammatically in FIG. 4, in one preferred embodiment of the present invention, a solid fuel charging apparatus 86 is provided for charging solid fuel or the like into the calcining zone 26 or in downstream portions of the clinkering zone 28 through port 88 in the rotary vessel 17. Methods and apparatus for modification of long kilns for burning solid fuels, preferably solid waste derived fuel as supplemental fuel in operating cement kilns is described in U.S. Pat. Nos. 4,930,965, issued Jun. 5, 1990; 5,078,594, issued Jan. 7, 1992; and 5,083,516, issued Jan. 28, 1992, which patents are expressly incorporated herein by reference. Use of the bypass for long kilns in accordance with the present invention can be used in combination with the methods and apparatus described and claimed in those patents to provide optimum control and efficiency of cement manufacture in long wet or dry process kilns. Indeed, it is anticipated that use of the presently described bypass technology in conjunction with the recently developed technology for burning solid waste derived combustibles as supplemental fuel for long kilns will not only allow long kiln operators to extend the operating life of their long kilns but as well enable them to continue to compete favorably in the market place with cement manufacturers using more fuel efficient pre-heater/pre-calcining facilities.

Figure 5:
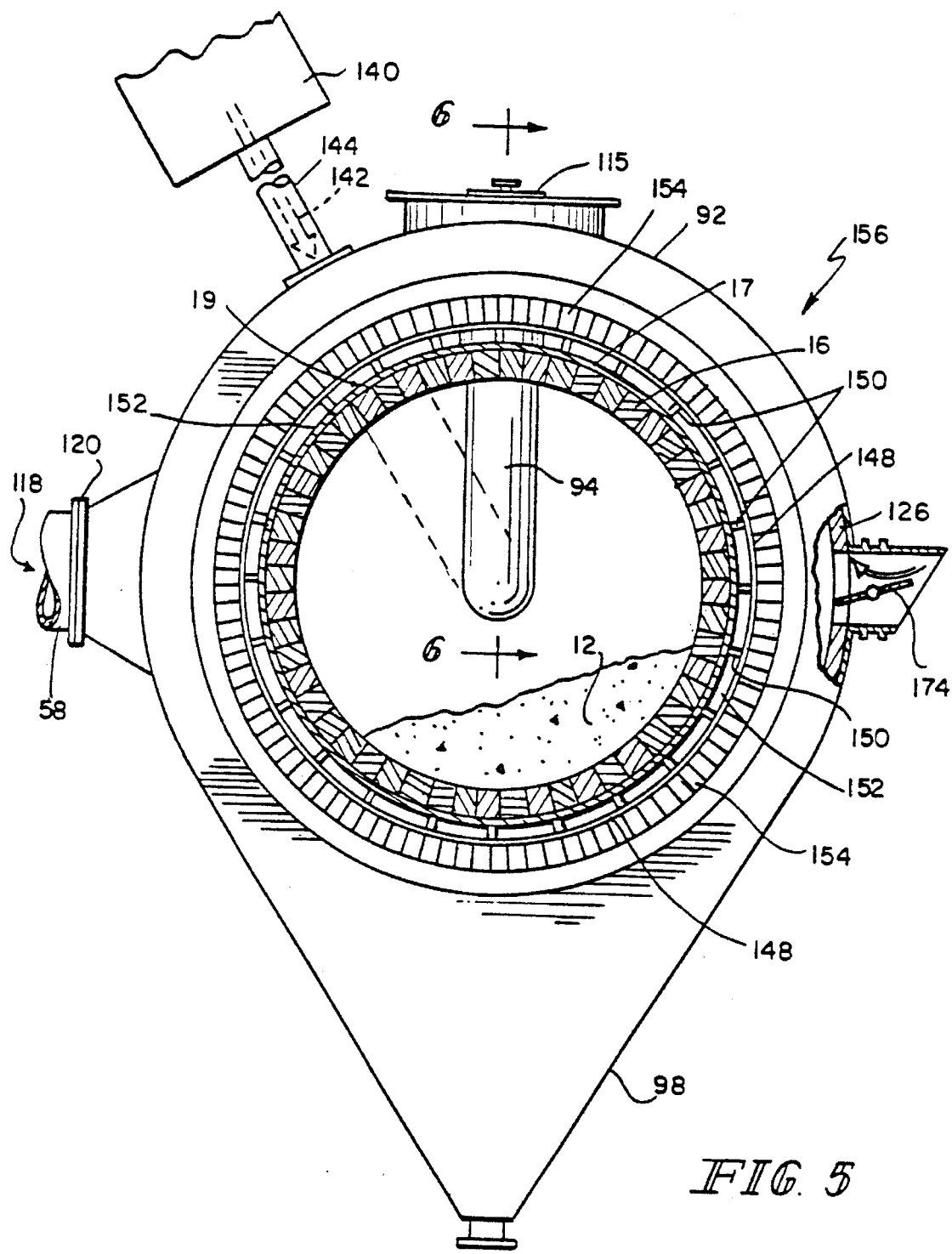
FIG. 5 is a cross-sectional view of an improved long rotary kiln showing a preferred embodiment of the venting apparatus component of this invention with portions broken away.
Figure 6:
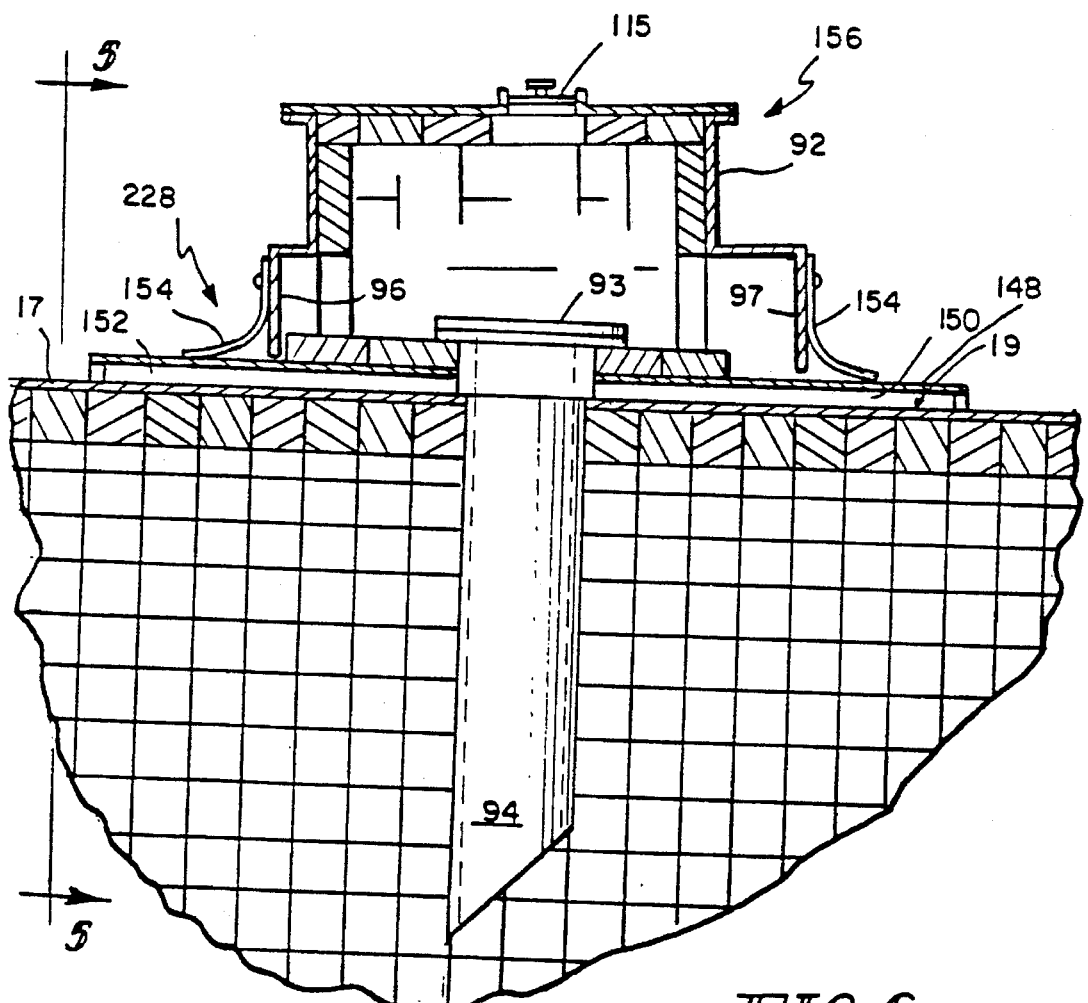
FIG. 6 is another view of the improved kiln shown in FIG. 5 illustrating the interface of the annular plenum and the rotary kiln vessel.

FIGS. 5 and 6 illustrate a preferred kiln venting apparatus 156 in accordance with this invention located on a rotary vessel 17 to enable formation of a kiln bypass stream by withdrawal of a portion of the kiln gas stream at a point upstream of the mineral drying zone during kiln operation. Venting apparatus 156 includes a refractory-lined plenum 92 in gas flow communication with the inside of rotary vessel 17 (having refractory liner 16) through bypass inlet tube 94 and bypass port 93 (FIG. 6) in rotary vessel 17. Annular plenum 92 is extended in its lower portion to form a dust collection funnel 98 for directing dust into a dust collector (not shown). Annular plenum 92 is provided with a sealable service hatch 115 to permit access to bypass port 93 and bypass inlet tube 94 for cleaning or repair, Bypass inlet tube 94 extends into rotary cylinder 17 from port 93 to prevent loss of mineral material 12 through port 93.

Annular plenum 92 is provided with bypass gas exit 118 having plenum isolation damper 120 for controlling gas flow communication between plenum 92 and bypass conduit 58. Plenum 92 is lined with refractory 126 and formed to include air damper valve 174 to allow kiln-gas-quenching air to enter plenum 92. Air damper valve 174 is located on plenum 92 diametrically opposed to bypass gas exit 118 to optimize quenching of kiln gases exiting vessel 17 into annular plenum 92.

Plenum 92 is also fitted with an air cannon 140 positioned to discharge bursts of compressed (90–110 psi) air 142 through nozzle 144 and into port 93 and bypass inlet tube 94 at pre-determined times when port 93 and bypass inlet tube 94 are in alignment with nozzle 144. Air cannon 140 is used periodically during kiln operation to clear condensed alkali from port 93 and bypass inlet tube 94 during kiln operation without perturbation of the on-going cement manufacturing process. An industrial 8-gauge shotgun (not shown) utilizing No. 4 zinc shot can be substituted for air cannon 140 or used in combination therewith to clear condensed alkali from port 93 and bypass inlet tube 94.

Air infiltration at the interface of the annular plenum 92 and rotating vessel 17 is controlled by use of a sealing system 228 best shown in FIG. 6. Sealing system 228 includes a sealing sleeve 148 supported by spacers 150 on the surface 19 of rotary vessel 17 to define an open annular air space 152 which allows radiant and convective cooling of the axial portion of the surface 19 of rotary vessel 17 circumferentially defined by annular plenum 92. Sealing system 228 further comprises a leaf seal 154 which is mounted on opposite lateral edges 96, 97 of annular plenum 92 in wiping/sealing contact with sealing sleeve 148. The leaf seal can be formed of one or more overlapping layers of stainless steel or mild steel leaves. One or more industrial sized fans can be used to direct a stream of air through annular air space 152 to promote uniform cooling of the surface 19 of rotary vessel 17.

FIG. 7 illustrates diagrammatically an operating conventional long kiln modified to include venting apparatus 156 located to withdraw a kiln bypass stream through conduit 58 under influence of negative pressure created by fan 40. Bypass conduit 58 is of a "grasshopper" configuration to minimize dust from the venting apparatus settling in conduit 58. The venting apparatus is located at a point along the length of the kiln about one kiln diameter upstream of the chain system (not shown). The kiln is also provide with a second venting apparatus 256 in air flow communication with air damper valve 262 through fan 260 and tertiary air input conduit 258. In operation, pre-determined amounts of tertiary air under the control of air damper valve 262, and optionally fan 260, is admitted into kiln gas stream 90 to provide oxygen-enriched kiln gas stream 91 to facilitate oxidation of hydrocarbons volatilized downstream of venting apparatus 256. Venting apparatus 156 is fitted with inlet tube cleaning means 141, which can be utilized from time to time during kiln operation, responsive to sensed reduction in flow volume of the kiln bypass stream through the conduit 58. Each venting apparatus 156, 256 is provided with a plenum isolation damper to enable operation of the kiln with either one, none, or both of the venting apparatuses 156, 256 in operation.

FIG. 8 is similar to FIG. 7 in that it illustrates an operating long kiln with a bypass forming venting apparatus 156 and a venting apparatus 256 for inlet of tertiary air upstream of a solid fuel charging apparatus 86 for charging solid fuel and the like into the calcining zone 26 through port 88 in the rotary vessel 17. Venting apparatus 256 is in air flow communication with clinker cooler 16 through tertiary air conduits 256, 258 and fan 260. In operation, pre-heated air from the clinker cooler 16 is injected into the kiln gas stream 90 to form oxygen enriched kiln gas stream 91 to support combustion of combustible solids used as supplemental fuel charged into the kiln through port 88.

A kiln bypass stream is withdrawn from the kiln gas stream and rotary vessel 17 through venting apparatus 156 under the influence of fans 40, 60, to reduce kiln gas velocities in the drying zone 24 and reduce the load on the kiln dust collection system.

Venting apparatus 256 is shown in FIG. 8 to be located at a point along the length of rotary vessel 17 at or near the hottest portion of the calcining zone 26. Those skilled in the art will appreciate that the significantly higher kiln gas temperatures at that point in the process will warrant careful selection and design of the portions of the venting apparatus exposed to the kiln gases. It is contemplated, for example, that the kiln gas temperatures could be sufficiently high that the operating lifetime of a port and inlet tube arrangement such as shown in FIGS. 2–3 and 5–6 may be marginal.

Under such circumstances, it is contemplated that alternate port construction can be utilized in conjunction with the annular plenum construction herein described and illustrated. Thus, for example, the assembly described and illustrated in FIG. 2 in Enkegaard U.S. Pat. No. 4,984,983, issued Jan. 15, 1991, expressly incorporated herein by reference, for delivery of solid waste into the burning zone of an operating cement kiln could be used in communication with the annular plenum component described in accordance with this invention to provide a venting apparatus better suited for installation at points along the kiln where kiln gas temperatures might be too high (from a materials life standpoint) for the presently described inlet tube construction.

Use of the venting apparatus of the present invention to enable enhanced control of the kiln gas stream in long wet or dry process cement kilns offers many advantages to the kiln operator, not only in terms of reduced dust loss and alkali volatiles management, but as well in the profound benefits of the enhanced clinker production capacity and enhanced energy and raw material utilization efficiency. There is a significant economic incentive for long kiln modification in accordance with this invention. Yet as illustrated hereinabove with reference to FIGS. 1, 4, 7 and 8, there are multiple variations in the use and processing of the bypass stream itself—even without regard to the alternatives for additional enhanced efficiencies through utilization of mid-kiln firing and tertiary air injection.

Figure 9:
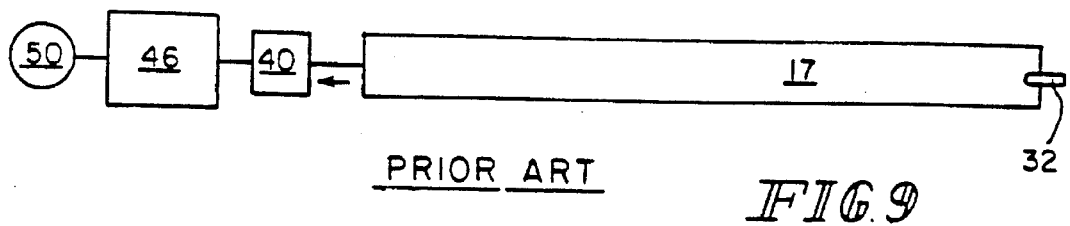
FIG. 9 is a schematic view of a long cement kiln.

FIG. 9 provides a simple schematic of the principal elements involved in kiln gas handling in a conventional long wet or dry process kiln. Kiln gases travel from burner 32 up through rotary vessel 17 under the influence of negative pressure induced by fan 40 from which the kiln gases are discharged into a kiln dust collection system 46 (or an alternative pollution control system) and out stack 50.

Figure 10:
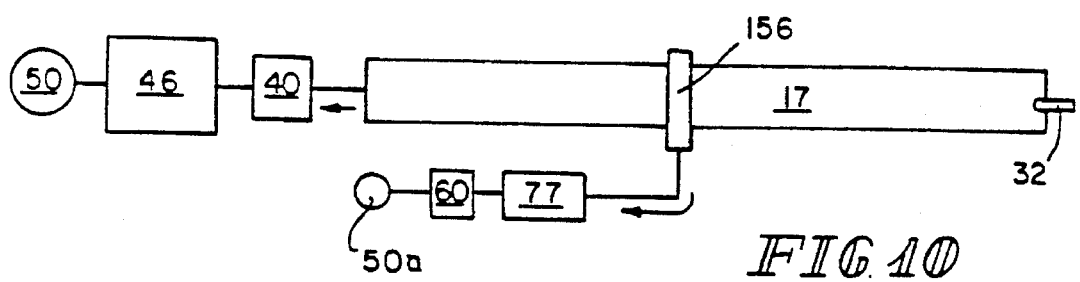
FIGS. 10–12 are schematic views of long kilns modified in accordance with this invention.
Figure 11:
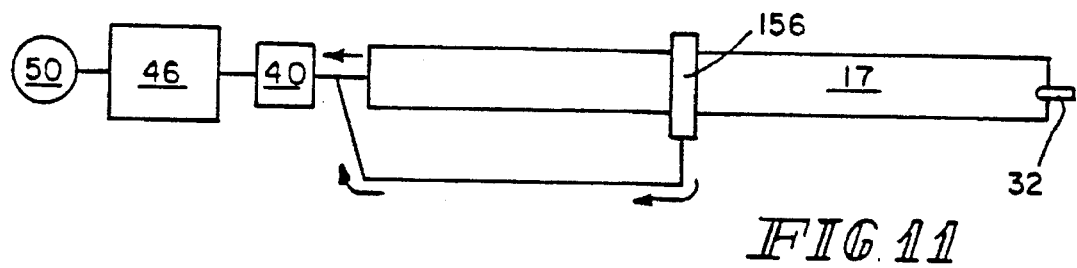
Figure 12:
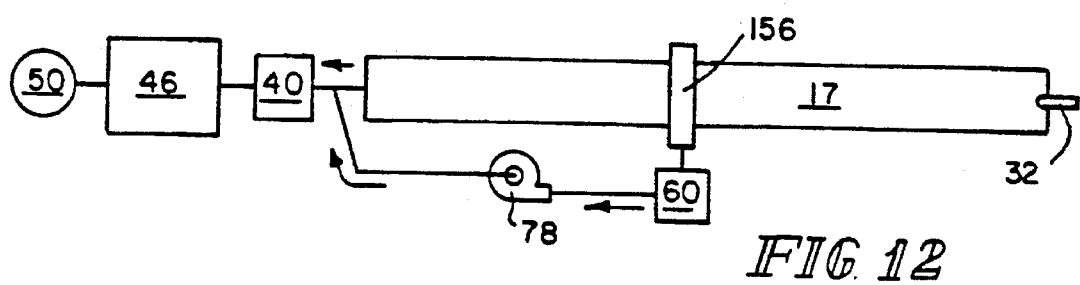

FIGS. 10–12 are simple schematics of three strategies for management/handling of kiln bypass gases. The strategy to be selected by the kiln operator will be dictated in part by the condition and performance of the long kiln targeted for bypass installation. Perhaps the most significant point for consideration is the assessment of condition and capacity of the existing kiln dust collection system (for example, an electrostatic precipitator). In considering use of the existing dust collection system, one must look at the effect on performance of increased volume due to air quenching (assuming return of the bypass stream to the kiln gas stream at a point upstream of the dust collection system) and the reduction in grain loading in the kiln gases to be treated. Thus, assuming a 10% volume bypass, if the bypass stream is quenched with two volumes of air for each volume of bypass kiln gas, return of the bypass to the kiln gas stream would increase the volume load on the dust collection system by 20%. Notably, during preliminary prototype operation, an increase of 10% volume was more than offset by reduction of grain loading to ½ of the value (due to reduced kiln gas velocities in the drying zone) leading to a net improved performance by the electrostatic precipitator.

FIG. 10 illustrates a kiln gas processing strategy that may well be preferred if it is certain that the existing dust collection system would need to be upgraded in anticipation of bypass installation. The bypass handling strategy depicted by the schematic in FIG. 10 contemplates use of venting apparatus 156 and fan 60 to withdraw the kiln bypass stream through a high efficiency dust collector 77 dedicated to processing the kiln bypass stream. One advantage of that kiln bypass processing strategy is that the kiln operator has only to dispose of one relatively low volume concentrated alkali waste stream. Other advantages include, of course, reduced kiln dust production (i.e., reduced load on the dust collection system) and reduced alkali content allowing return of kiln dust to the process. The disadvantage of that strategy, however, is that it is the most capital intensive, and care must be taken to ensure that the kiln exit gases remain above the dew point.

The kiln bypass processing strategy depicted by the schematic in FIG. 11 requires the least capital investment. A bypass stream is pulled from the kiln gas stream into venting apparatus 156 under the influence of negative pressure of fan 40. The conduit is sized to assure that the pressure differential will be effective to withdraw at least 10% of the kiln gas stream into the bypass. No separate bypass fan is necessary. The bypass conduit is designed to have a "grasshopper" configuration to minimize dust buildup and can have a higher operating temperature because of no fan. Advantages of the bypass management strategy depicted in FIG. 11 is that it is the least expensive to construct, and the kiln exit gas temperature can be less than the dew point and then raised to above the dew point by the return of the bypass stream to the kiln gas stream upstream of the kiln dust collection system. The bypass design of FIG. 11 provides significantly reduced dust load, but concomitantly it results in higher alkali content (weight percent) in the kiln dust.

The schematic of FIG. 12 represents the most economical bypass management strategy if the long kiln targeted for bypass installation has excess capacity in its existing kiln dust collection system (electrostatic precipitator). The bypass stream is withdrawn from the kiln gas stream through venting apparatus 156 under the influence of fans 60 and 40. The bypass stream is directed through a cyclone precipitator 78 which results in collection of a high percentage of the precipitated alkali fume from the bypass stream before it is returned to the kiln gas stream upstream of the kiln dust collection system 46. As in the case of the bypass design represented in FIG. 11, the bypass design in FIG. 12 will allow kiln exit gas temperatures to be less than the dew point. But unlike the process design of FIG. 11, the bypass processing schematically represented in FIG. 12 allows substantial concentration of the precipitated alkali fume and, accordingly, reduced total alkali content in the kiln dust collected in dust collection system 46. It is anticipated that that processing of the bypass stream as depicted in FIG. 12 will allow return of kiln dust to the mineral feed for reprocessing without compromising clinker quality.

Although the invention has been described and defined in detail with reference to certain preferred embodiments, variations and modifications exist within the scope and spirit of the invention as described and claimed in the following claims.

We claim:

1. A method for improving the oxidation of hydrocarbons in a kiln gas stream in a conventional long rotary cement kiln including a rotary vessel having a clinkering zone, an intermediate calcining zone, a mineral drying zone and said kiln gas stream flowing from said clinkering zone through the calcining and drying zones, said kiln modified to include a solid fuel charging apparatus for delivering combustible solids into the intermediate calcining zone in said kiln, said method comprising the steps of forming an air injection port in the wall of the rotary vessel of the kiln at a point downstream relative to kiln gas flow of the solid fuel charging apparatus and upstream of the drying zone, and injecting air into the kiln gas stream through the air injection port in the rotary vessel wall to provide an oxygen-enriched kiln gas stream.

2. The method of claim 1 further comprising the step of preheating the air prior to injecting it into the kiln.

3. A method for improving the oxidation of hydrocarbons in a kiln gas stream in a conventional long rotary cement kiln including a rotary vessel having a clinkering zone, an intermediate calcining zone, a mineral drying zone, and said kiln gas stream flowing from said clinkering zone through the calcining and drying zones, said method comprising the steps of forming an air injection port in a wall of the rotary vessel of the kiln at a point downstream, relative to kiln gas flow, of the calcining zone and upstream of the drying zone, and injecting air into the kiln gas stream through the air injection port in the rotary vessel to provide an oxygen-enriched kiln gas stream.

4. The method of claim 3 wherein the air injection port is formed in the wall of the rotary vessel at a point where the kiln gas stream is 1800° F. or less.

* * * * *

UNITED STATES PATENT AND TRADEMARK OFFICE
CERTIFICATE OF CORRECTION

PATENT NO. : 5,569,030
DATED : October 29, 1996
INVENTOR(S) : James R. Tutt

It is certified that error appears in the above-identified patent and that said Letters Patent is hereby corrected as shown below:

In the list of inventors on the Title Page, please delete "Eric R. Hansen, Shawnee, Kans;".

Signed and Sealed this

Nineteenth Day of June, 2001

*Attest:*

*Attesting Officer*

NICHOLAS P. GODICI
*Acting Director of the United States Patent and Trademark Office*